3,054,822
BENZYL SUBSTITUTED PROPYLAMINES

Manfred Schorr, Rudolf Fussgänger, and Georg Nesemann, Frankfurt am Main, and Fritz Bauer, Bad Soden (Taunus), Germany, assignors to Farbwerke Hoechst Aktiengesellschaft vormals Meister Lucius & Brüning, Frankfurt am Main, Germany, a corporation of Germany
No Drawing. Filed Nov. 28, 1960, Ser. No. 71,901
Claims priority, application Germany Nov. 27, 1959
6 Claims. (Cl. 260—471)

The present invention relates to substituted amines of the formula

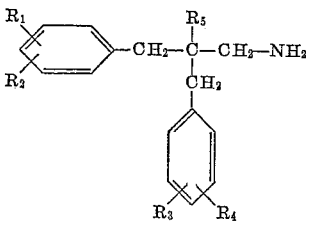

wherein $R_1$ and $R_3$ represent halogen atoms, $R_2$ and $R_4$ hydrogen or halogen atoms and $R_5$ represents a hydrogen atom, an alkyl group containing 1–5 carbon atoms, a hydroxy-methyl group or a carbalkoxy group the alkyl component of which containing 1–4 carbon atoms.

The new compounds are well compatible and exhibit valuable therapeutical properties. They are particularly suitable as disinfectants, bacteriostatics and fungistatics.

The present invention also relates to a process for preparing the new substituted amines corresponding to the above formula which are obtained by reducing a nitrile corresponding to the following formula

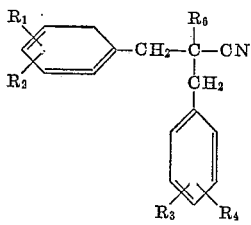

wherein $R_1$, $R_2$, $R_3$ and $R_4$ have the meanings indicated above and $R_6$ represents a hydrogen atom, an alkyl group containing 1–5 carbon atoms or a carbalkoxy group the alkyl component of which containing 1–4 carbon atoms, and, if desired, converting the bases obtained into the corresponding salts by treatment with inorganic or organic acids.

As radicals $R_1$ and $R_3$ being contained in the nitriles serving as starting materials which correspond to the above general formula, there may be used halogen atoms such as fluorine, chlorine, bromine and iodine, particularly chlorine.

As radicals $R_2$ and $R_4$ which may represent not only halogen atoms such as fluorine, chlorine, bromine and iodine but also hydrogen atoms, there may also preferably be used chlorine atoms. Both benzene nuclei of the starting materials may be substituted by equal or different halogen atoms.

The substituent $R_6$ may represent a hydrogen atom or a straight-chain or branched alkyl group of low molecular weight containing 1–5 carbon atoms such as methyl, ethyl, n-propyl, isopropyl, n-butyl, isobutyl or n-amyl. $R_6$ may, furthermore, represent a carbalkoxy group, the alkyl component of which containing 1–4 carbon atoms, the propyl and butyl groups having straight or branched chains.

The following starting materials may be mentioned more especially: α,α-bis-(4-chlorobenzyl)-propionitrile, α,α-bis-(3,4 - dichlorobenzyl)-propionitrile, α - (4-chlorobenzyl)-β(4' - chlorophenyl)-propionitrile,α-(3,4-dichlorobenzyl) - β - (3,4-dichlorophenyl)-propionitrile,α-(2,4-dichlorobenzyl)-β-(2,4-dichlorophenyl) - propionitrile,α-(3,4-dichlorobenzyl)-β-(4-chlorophenyl) - propionitrile, α,α-bis-(3,4-dichlorobenzyl) - valeronitrile, bis-(4-chlorobenzyl)-cyanoacetic acid methyl ester, bis-(3,4-dichlorobenzyl)-cyanoacetic acid methyl ester, bis-(3,4-dichlorobenzyl)-cyanoacetic acid ethyl ester and bis-(2,4-dichlorobenzyl)-cyanoacetic acid n-butyl ester.

The starting materials can be prepared in different manner. They may, for example, be prepared as follows: a nitrile possessing a methylene group in α-position and a substituted benzylhalide are dissolved in an inert solvent such, for example, as benzene, and a suspension of sodium amide in the same solvent is caused to act upon this solution whereby the hydrogen atoms of the methylene group vicinal to the cyano group are substituted by two benzyl radicals with evolution of ammonia. Another manner of preparing the nitriles consists, for example, in reacting substituted benzylhalides with the sodium compounds of cyanoacetic acid alkyl esters with the use of corresponding alcohols as solvents. In this manner there are obtained cyanoacetic acid alkyl esters substituted by two benzyl radicals, the ester groups of which may be hydrolized, if desired, in an alkaline medium and decarboxylized by dry heating to a temperature within the range of 180–250° C.

The substituted amines are prepared by generally known chemical methods which are used for the reduction of nitriles to the corresponding amines. Thus, for example, the reduction can be carried out by causing a metal hydride such as lithium-aluminum-hydride or sodium-borohydride to act upon the nitrile. The process is preferably carried out with the use of an anhydrous inert solvent. As such solvents there are suitably used, for example, aliphatic or cyclic ethers such as diethyl ether, dioxane, or tetrahydrofurane. The reaction may be carried out at temperatures of 0° C. to 150° C., or preferably at the boiling temperatures of the solvents used. The reaction is advantageously carried out while first cooling with ice and then selecting the corresponding boiling temperature of the solvent.

If the nitrile subjected to the influence of the metal hydride simultaneously contains a carbalkoxy group in the molecule, this latter group may simultaneously be reduced, if desired, to the hydroxymethyl group provided that a sufficient quantity of reducing agent was used.

The reduction of the nitriles can be carried out with particular advantage by catalytical hydrogenation. In this case the process is suitably carried out in the presence of alcohols or ethers such as methanol, ethanol or dioxane as solvents and an excess of ammonia is added in order to avoid the formation of secondary amines. As catalysts there may be used the usual substances, preferably Raney-nickel or Raney-cobalt. The hydrogenation is generally carried out at an elevated hydrogen pressure, advantageously within the range of 50 to 150 atmospheres gauge, and at a moderately elevated temperature, suitably within the range of 40 to 50° C. Under these reaction conditions halogen atoms contained in the starting materials are surprisingly not eliminated in the form of hydrogen halide. When the reaction temperature is increased beyond the indicated range, however, partial separation of halogen sets in.

For working up, the reaction mixture is suitably separated from the catalyst by suction-filtration and the solvent is eliminated by distillation. For the purpose of purification the crude product being contained in the distillation residue is advantageously converted into a corresponding acid addition salt such, for example, as the hydrochloride, and the salt obtained is purified in usual manner since the distillation of the crude product generally proceeds with decomposition and, therefore, involves considerable losses of substance.

In general, the new substituted amines obtained are colorless or yellow viscous oils which can be distilled under reduced pressure with more or less strong decomposition only. They are active in the form of free bases, more particularly in the form of their non-toxic acid addition salts which may be obtained in usual manner by treating the free bases with inorganic or organic acids. As inorganic acids there may be mentioned: hydrohalic acids such as hydrochloric or hydrobromic acid, sulfuric acid, phosphoric acid and amidosulfonic acid. As organic acids there may be used for example acetic acid, propionic acid, butyric acid, aceturic acid, tartaric acid, succinic acid, malic acid, maleic acid, fumaric acid, sorbinic acid, citric acid, aspartic acid, para-aminobenzoic acid, salicylic acid and ethylene diamine-tetracetic acid.

The acid addition salts which may be obtained by treatment with the acids are mostly colorless crystalline compounds the solubility of which depends upon both the type of the anion and the number of the halogen atoms being contained in the molecule.

The new substituted amines obtained by this invention possess in addition to good compatibility valuable therapeutic properties the most interesting of which are the bactericidal, fungicidal, bacteriostatic and fungistatic properties. The compounds have an effect upon a large number of gram-positive and gram-negative germs up to a lower concentration of about 2–3 γ/cc. The following table gives particulars on toxicity, bacteriostatic and bactericidal efficacy of the products obtained. For the purpose of a better comparability, the data on toxicity and the test results of a number of products obtained are compared in this table with the corresponding test results of 1,1-bis-(4-chlorophenyl)-2-aminopropane-hydrochloride known as test preparation e from Chem. Abstr. 49 (1955), page 9040.

TABLE

| | Toxicity (maximum tolerated dose) of test preparations a–e in mice (in mg./20 g.) | | | | |
|---|---|---|---|---|---|
| | a | b | c | d | e |
| s.c. | 25 | 6.25 | 5.0 | 7.8 | 1.0 |
| p.o. | 15 | 6.25 | 6.25 | 6.25 | 3.0 |
| | Lowest effective concentration causing bactericidal activity in γ/ml. read off after 15 minutes | | | | |
| (a) Germs: | | | | | |
| Staphylococcus aureus | 31.5 | 12.5 | 125 | 15.6 | 500 |
| E. coli | 31.5 | 25 | 125 | 15.6 | 250 |
| Bacterium typhi | 31.5 | 12.5 | 62.5 | 15.6 | 200 |
| | Lowest effective concentration causing bateriostatic activity in γmg./l. | | | | |
| Streptococcus haemolyticus | 2 | 3 | 6.25 | 3 | 40 |
| Corynebacterium diphtheriae | 8 | 4 | 2 | 4 | 40 |
| Staphylococcus aureus | 8 | 6 | 1.6 | 4 | 40 |
| E. coli | 15.6 | 8 | 156 | 3 | 80 |
| | Lowest effective concentration causing fungistatic activity | | | | |
| (b) Pathogenic yeasts, Candida albicans | 8 | 20 | 62.5 | 15.6 | 313 |
| (c) Apathogenic mould fungi, Penicillium glaucum | 4 | 4 | 62.5 | 4 | 156 |

Test preparation:
a=2,2-bis-(4'-chlorobenzyl)-propylamine-hydrochloride.
b=2-(3',4'-dichlorobenzyl)-3-(3',4'-dichlorophenyl)-propylamine-hydrochloride.
c=β-amino-α,α-bis-(4-chlorobenzyl)-propionic acid methyl ester hydrochloride.
d=2-(2',4'-dichlotobenzyl)-3-(2',4'-dichlorophenyl)-propylamine hydrochloride.
e=1,1-bis-(4-chlotophenyl)-2-aminopropane hydrochloride [cf. Chemical Abstracts 49, (1955), page 9040].

The bactericidal efficacy of the compounds was determined according to the Rideal-Walker test, the inoculation on the nutrient medium of grape sugar/bouillon being carried out after 15 minutes.

The bacteriostatic efficacy was determined according to the known Wright method (The Lancet, 1912) in a series of dilution tests, depending on the type of the germs used, in either bouillon or serum bouillon as nutrient medium with only a small quantity of germs. The reading was done after an incubation period of 18–20 hours at 37° C. just in the moment when the clear test solution became turbid.

The fungistatic efficacy of the compounds was determined following the method described by Schraufstätter, Richter and Dittscheid in "Archiv für Dermatologie und Syphilis," volume 188, page 259 (1949), in a series of dilution tests.

From the comparison of the test results follows that the substituted amines obtained by this invention are distinctly superior to the known 1,1-bis-(4-chlorophenyl)-2-amino-propane-hydrochloride both as regards compatibility and their efficacy against microorganisms. The efficacy of the products obtained is chiefly bactericidal so that the preparations can be used for disinfectant and/or preserving purposes.

The new substituted amines or their salts can be administered as such or in the form of galenical preparations, for example, gelees, powders, ointments, pastes, mixtures that require shaking, tinctures, solutions or suspensions in admixture or conjunction with non-toxic, pharmaceutically acceptable organic or inorganic carrier substances. For the production of such galenical preparations there may be used auxiliary materials which do not react with the new compounds, for example, water, gelatine, bolus, lactose, starch, magnesium stearate, talcum, vegetable oils, benzyl alcohol, gums, polyethyleneglycol, cholesterol, petroleum jelly, zinc oxide, titanium dioxide or other carriers known for medicaments. The new products of the invention or pharmaceutical preparations containing them may be sterilized and/or may contain assistants, such as stabilizers, buffers, wetting agents, emulsifiers or salts for regulating the osmotic pressure. The pharmaceutical preparations may be prepared by the usual methods.

The active compounds may be present in the pharmaceutical preparations, for example, in a portion within the range of 0.1–5%. When the products of the invention are used in the form of gelees, a medium dose of 0.5% by weight has proved to be advantageous.

The following examples serve to illustrate the invention but they are not intended to limit it thereto.

*Example 1*

2,2-BIS-(4'-CHLOROBENZYL)-PROPYLAMINE 65 grams of α,α-bis-(4-chlorobenzyl)-propionitrile are dissolved in 1000 cc. of dioxane which had been saturated with ammonia at room temperature and, after the addition of about 10 grams of Raney nickel, the solution is agitated at a temperature within the range of 40–50° C. and a pressure of 100 atmospheres gauge, while introducing hydrogen, until the absorption of hydrogen is complete. The catalyst is then removed by suction-filtration and the solvent is distilled off under slightly reduced pressure. For the purpose of purification the remaining crude amine (65 grams) is converted into the corresponding hydrochloride as follows: the crude product is dissolved in 150 cc. of acetone, 37 cc. of alcoholic hydrochloric acid of 21% strength are added to the solution and, after some time, 150 diisopropyl ether are added to the whole in order to complete crystallization. There are obtained 46 grams of 2,2-bis-(4'-chlorobenzyl)-propylamine-hydrochloride in the form of small colorless felted needles which melt at a temperature within the range of from 225–228° C. After recrystallization from ethanol/diisopropyl ether, the salt melts at a temperature ranging between 229 and 230° C.

By agitating the hydrochloride with dilute sodium hydroxide solution and ether, drying the ether layer over sodium sulfate and distilling the solvent, the 2,2-bis-(4'-chlorobenzyl)-propylamine is obtained as light-yellow thick oil.

The α,α-bis-(4-chlorobenzyl)-propionitrile serving as starting material can be prepared as follows: to a solution of 11 grams of propionitrile and 64.4 grams of 4-chlorobenzylchloride in 200 cc. of dry benzene which has been heated to a temperature ranging between 50 and 60° C., there is added in small quantities, while mechanically agitating well, a suspension of 19.5 grams of sodium amide of 80% strength in 50 cc. of dry benzene. After each addition, there can be observed a distinct reaction (evolution of ammonia). The reaction mixture is stirred for another hour at the same temperature and then poured into ice water. The benzene layer is separated, washed with water, dried over sodium sulfate, completely concentrated and 50 cc. of methanol are added to the residue. When cooling and triturating the mixture the α,α-bis-(4-chlorobenzyl)-propionitrile crystallizes out. There are obtained 20 grams of the compound melting at a temperature ranging between 104 and 105° C. It can be further purified by recrystallization from alcohol and melts then at a temperature ranging between 106 and 107° C.

*Example 2*

2,2-BIS-(3',4'-DICHLOROBENZYL)-PROPYLAMINE 115 grams of α,α-bis-(3,4-dichlorobenzyl)-propionitrile are hydrated in a mixture of 2000 cc. of dioxane saturated with ammonia and 15–20 grams of Raney nickel at a temperature ranging between 40° C. and 50° C., and under a pressure of 100 atmospheres gauge until the absorption of hydrogen is complete. The oil remaining after suction-filtration of the catalyst and distillation of the solvent is dissolved in 1500 cc. of ether and mixed with 54 cc. of alcoholic hydrochloric acid of 21% strength whereby a salt immediately separates. The product is filtered with suction, washed with water and dried in the air; there are obtained 102 grams. By recrystallization from 1000 cc. of alcohol to which 1000 cc. of diisopropyl ether are added prior to the suction-filtration in order to complete the crystallization, there are obtained 71 grams of pure 2,2 - bis-(3',4'-dichlorobenzyl)-propylamine-hydrochloride melting at a temperature ranging between 248° C. and 250° C.

In order to obtain the pure free base, the salt is agitated with dilute sodium hydroxide solution and ether until completely dissolved, the ethereal layer is dried over potassium carbonate and the ether is distilled off. The 2,2-bis-(3',4'-dichlorobenzyl)-propylamine constitutes a light yellow thick oil.

The α,α-bis-(3,4-dichlorobenzyl)-propionitrile serving as starting material can be prepared as follows: a suspension of 147 grams of sodium amide of 80% strength in 400 cc. of dry benzene is added in small portions, while stirring vigorously, to a solution of 82.5 grams of propionitrile and 586.5 grams of 3,4-dichlorobenzyl-chloride in 1000 cc. of dry benzene which has been heated to 50–60° C. After each addition a vivid reaction can be observed. The reaction mixture is stirred for two hours at the same temperature and then poured in about 1000 CC. of ice water. The organic phase is separated and washed with water. After drying over calcium chloride the benzene is distilled off. The residue solidifying in a crystalline form is comminuted in the mortar and triturated with a small quantity of methanol. After suction-filtration there are obtained 370 grams of a yellow-colored product. After recrystallization from isopropanol, the α,α-bis-(3,4-dichlorobenzyl)-propionitrile is obtained in the form of almost colorless crystals melting at a temperature ranging between 131 and 132° C.

*Example 3*

2-(4'-CHLOROBENZYL)-3-(4''-CHLOROPHENYL)-PROPYLAMINE 85 grams of α-(4-chlorobenzyl)-β-(4'chlorophenyl)-propionitrile are dissolved in 800 cc. of dioxane saturated with ammonia and the solution is hydrated with Raney nickel as catalyst at a temperature ranging between 40° C. and 50° C. and a pressure of 100 atmospheres gauge. After completion of the hydrogen absorption, the Raney nickel is removed by suction-filtration and the dioxane is distilled off under slightly reduced pressure. There remain behind 83 grams of a crude product which is dissolved in 1000 cc. of ether and mixed with 40 cc. of alcoholic hydrochloric acid of 28% strength whereby the hydrochloride separates in solid form. The salt is filtered with suction, washed with ether and dried at a temperature of about 100° C. There are obtained 82 grams of 2-(4'-chlorobenzyl)-3-(4''-chlorophenyl)-propylamine-hydrochloride melting at 163–164° C. The melting point remains constant even after recrystallization from a mixture of isopropanol/benzene/diisopropyl ether. The free base 2-(4'-chlorobenzyl)-3-(4''-chlorophenyl)-propylamine can be obtained from the salt in usual manner and forms a light yellow thick oil.

The α-(4-chlorobenzyl)β-(4'-chlorophenyl)-propionitrile serving as starting material can be prepared as follows: into a sodium methylate solution obtained by dissolving 46 grams of sodium 750 cc. of absolute methanol there are added dropwise at room temperature, while mechanically stirring, 110 grams of cyanoacetic acid methyl ester and, after mechanically stirring for 30 minutes, 354 grams of 4-chlorobenzyl-chloride the temperature being maintained below 35° C. by slight cooling. After completion of the addition, the reaction mixture is further heated for one hour under reflux. The methanol is then distilled off to a large extent and the residue is poured into water whereby the reaction product solidifies. The precipitate is filtered off with suction and washed well with water. There are obtained 369 grams of bis-(4-chlorobenzyl)-cyanoacetic acid-methyl ester which melts at a temperature ranging between 110° C. and 112° C. By recrystallization from ethanol the product can be purified and then melts at 113–115° C.

150 grams of the bis-(4-chlorobenzyl)-cyanoacetic acid methyl ester so obtained are introduced into a solution of 24.2 grams of potassium hydroxide in 450 cc. of methanol and the whole is heated for 5 minutes under reflux whereby practically complete dissolution takes place. The major part of the solvent is then distilled off and the residue is poured into water. The solid product so obtained which consists of unreacted starting material (27 grams) is filtered with suction after standing for several hours and after-washed with water. The filtrate is acidified whereby a viscous semisolid precipitate is formed. After complete deposition, the supernatant aqueous layer is decanted and the viscous residue is treated with diisopropylether whereby the major part is dissolved. The undissolved substance is filtered with suction; it is a bis-(4-chlorobenzyl)-malonic acid-monoamide and obtained in an amount of 15 grams. The filtrate is agitated with water, dried over sodium sulfate and the diisopropyl ether is distilled off. The residue is dissolved in 150 cc. of benzene and precipitated again by the addition of 500 cc. of petroleum ether. There are obatined 100 grams of practically colorless bis-(4-chlorobenzyl)-cyanoacetic acid melting at 158–160° C. After recrystallization from benzene the compound melts at 163–164° C.

100 grams of the bis-(4-chlorobenzyl)-cyanoacetic acid obtained are heated to 210° C. (inner temperature) in an open flask. The temperature increases spontaneously to about 260° C. with vivid evolution of carbon dioxide. The reaction is complete within a few minutes. The reaction mixture is cooled and meanwhile mixed with 50 cc. of alcohol whereby crystallization takes place. After suction-filtration and washing with a small quantity of alcohol, there are obtained 82 grams of colorless α-(4-chlorobenzyl) - β - (4'-chlorophenyl)-propionitrile which melts at 102–103° C. The melting point remains constant after recrystallization from alcohol.

*Example 4*

2-(3',4'-DICHLOROBENZYL)-3-(3',4'-DICHLOROPHENYL)-PROPYLAMINE

A suspension of 12.6 grams of lithium-aluminium-hydride in 600 cc. of dry ether is introduced into the boiling flask of a Soxhlet-extractor and 70 grams of α-(3,4-dichlorobenzyl)-β-(3,4-dichlorophenyl) - propionitrile are introduced into the socket. The mixture is heated at the boil until the nitrile in the socket is dissolved. Then there are added carefully and successively 5 cc. of water, 3.8 cc. of sodium hydroxide solution of 20% strength and 18 cc. of water, and the mixture is stirred until the grey precipitate first formed has become colorless. It is filtered with suction and washed well with ether. The filtrate is dried over potassium carbonate and mixed after filtration with 19 cc. of alcoholic hydrochloric acid of 31% strength. The 2-(3',4'-dichlorobenzyl)-3-(3',4'-dichlorophenyl)-propylamine-hydrochloride immediately crystallizes out. There are obtained 57 grams of a colorless product which melts at 200–201° C.

The free 2 - (3',4'-dichlorobenzyl) - 3 - (3',4'-dichlorophenyl)-propylamine can be prepared in usual manner from the hydrochloride. It is a light-yellow, very viscous oil. The oil is distilled under reduced pressure whereby part of it passes over with strong decomposition at a temperature ranging between 245° C. and 250° C. under a pressure of 2.5 mm. of mercury; the residue remains as resin.

The acetate of acetic ester/diisopropyl ether melts at 116–117° C., the sorbinate of acetic acid ethyl ester melts at 139° C.–140° C.

The α - (3,4-dichlorobenzyl) - β - (3,4-dichlorophenyl)-propionitrile serving as starting material can be obtained in the following manner: a sodium-methylate solution is prepared by dissolving 46 grams of sodium in 750 cc. of methanol. To this solution there are added dropwise first 110 grams of cyanoacetic acid-methyl ester and, after stirring for 30 minutes, 391 grams of 3,4-dichlorobenzyl-chloride. Finally, the reaction mixture is heated for one hour under reflux whereby the reaction product crystallizes out. When the crystallization does not take place it can be initiated by inoculation. After cooling, the liquid part is removed by suction-filtration, the residue is washed with a small quantity of methanol and the filter cake obtained is stirred with water in order to dissolve out the sodium chloride. The solution is then removed by suction-filtration, the substance is washed with water until no more chlorine ions can be detected and the residue is dried at about 100° C. There are obtained 350–360 grams of bis-(3,4-dichlorobenzyl)-cyanoacetic acid-methyl ester melting at 106–107° C. The product can be recrystallized from alcohol for further purification.

348 grams of bis-(3,4-dichlorobenzyl)-cyanoacetic acid-methyl ester are introduced into a solution of 47 grams of potassium hydroxide in 940 cc. of methanol and 15 cc. of water and the whole is heated for about 5 minutes under reflux. The methanol is then distilled off to a large extent and the residue is poured into water. A rest of unsaponified starting material remains undissolved. It is filtered off with suction (26 grams) and the filtrate is acidified with concentrated hydrochloric acid. The saponification product separates in semi-solid viscous form but solidifies after several hours to give a hard mass. This process can be accelerated by inoculation. The product which has been disintegrated in a mortar is suction-filtered and thoroughly washed with water. There are obtained 260 grams of bis-(3,4-dichlorobenzyl)-cyanoacetic acid melting at 170–171° C. After recrystallization from acetonitrile, the product melts at 172–174° C.

242 grams of bis-(3,4-dichlorobenzyl)-cyanoacetic acid are heated in an open flask. Vivid reaction sets in at about 180° C. so that the temperature automatically rises to 220–230° C. After a few minutes carbon dioxide evolution is complete. While cooling there are added 200 cc. of ethanol. The product crystallized out is suction-filtered. There are obtained 203 grams of colorless α-(3,4 - dichlorobenzyl)-β-(3,4-dichlorophenyl) - propionitrile melting at 116–118° C. After recrystallization from alcohol, the melting point remains constant.

*Example 5*

2-(3',4'-DICHLOROBENZYL)-3-(3',4'-DICHLOROPHENYL)-PROPYLAMINE 90 grams of α - (3,4 - dichlorobenzyl)-β-(3,4-dichlorophenyl)-propionitrile prepared as described in Example 4, are dissolved in 800 cc. of dioxane, which has been saturated with ammonia, and hydrated with Raney nickel as catalyst at a temperature of 40° C. and a pressure of 120 atmospheres gauge until the hydrogen absorption is complete. After separation of the catalyst and evaporation of the solvent, the crude amine is dissolved in 500 cc. of diisopropyl ether and 33 cc. of alcoholic hydrochloric acid of 28% strength are added to the solution. The hydrochloride separates first as a smeary mass but solidifies rapidly. After addition of a further 500 cc. of diisopropyl ether, the precipitate is filtered with suction and after-washed with diisopropyl ether. There are obtained 93 grams of 2-(3',4'-dichlorobenzyl)-3-(3',4'-dichlorophenyl)-propylamine-hydrochloride melting at 195–198° C. The product obtained can be further purified by recrystallization from isopropanol, it melts then at 199–201° C.

*Example 6*

2-(2',4'-DICHLOROPHENYL)-3-(2',4'-DICHLOROPHENYL)-PROPYLAMINE 72 grams of α-(2,4-dichlorobenzyl)-β-(2,4-dichlorophenyl)-propionitrile are dissolved in 800 cc. of dioxane which has been saturated with ammonia and the solution is hydrated with Raney nickel as catalyst at 50° C. and a pressure of 80–110 atmospheres gauge. After separation from the catalyst and distillation of the solvent, the crude amine is dissolved in 700 cc. of diisopropyl ether and mixed with alcoholic hydrochloric acid of 31% strength. The 2-(2',4' - dichlorobenzyl) - 3 - (2',4'-dichlorophenyl)-propylamine-hydrochloride separates immediately in solid form and can be filtered off with suction and after-washed with ether. There are obtained 78 grams of the salt which melts at 217–220° C. After recrystallization from ethanol/diisopropyl ether, the compound melts at 221–222° C.

The free 2 - (2',4' - dichlorobenzyl)-3-(2',4'-dichlorophenyl)-propylamine which represents a light yellow viscous oil can be obtained from the hydrochloride in usual manner.

The α-(2,4-dichlorobenzyl)-β-(2,4-dichlorophenyl)-propionitrile serving as starting material can be prepared as follows: to a solution of 50 grams of sodium in 810 cc. of absolute methanol there was successively added dropwise 120 grams of cyanoacetic acid-methyl ester and 425 grams of 2,4-dichlorobenzylchloride and the mixture is then heated for one hour under reflux. Crystallization takes place when cooling. The residue is filtered off with suction and washed with methanol. The solid filter residue is stirred with water, suction-filtered again and thoroughly washed with water. There are obtained 270 grams of bis - (2,4 - dichlorobenzyl) - cyanoacetic acid - methyl ester which may be further dried by recrystallization from alcohol. It melts at 83–84° C.

270 grams of bis-(2,4-dichlorobenzyl)-cyanoacetic acid-methyl ester are introduced into a solution of 37 grams of potassium hydroxide in 725 cc. of methanol and 12 cc. of water and the whole is heated at the boil for about 5 minutes. The greater part of the solvent is distilled off and the residue is mixed with 2000–3000 cc. of water. Except for a small portion all is dissolved. The whole is filtered and the filtrate is acidified with concentrated hydrochloric acid. When allowed to stand the precipitating smeary product solidifies to a solid mass which, after comminution, is filtered off with suction and washed well with water. There are obtained 220 grams of bis-(2,4-dichlorobenzyl)-cyanoacetic acid which are further purified by recrystallization from benzene and melt then at 172–173° C.

200 grams of bis-(2,4-dichlorobenzyl)-cyanoacetic acid are heated in an open flask until decarboxylation sets in which occurs at an inner temperature of about 180° C. The temperature rises automatically to about 220° C. with the beginning of the reaction. The reaction is complete after a few minutes. While cooling, 200 cc. of alcohol are added and the reaction mixture is filtered off with suction after completion of the crystallization. There are obtained 160 grams of α-(2,4-dichlorobenzyl)-β-(2,4-dichlorophenyl)-propionitrile melting at 93–96° C. After recrystallization from alcohol, the nitrile melts at 96–97° C.

*Example 7*

2-(3',4'-DICHLOROBENZYL)-3(4'-CHLOROPHENYL)-PROPYLAMINE 100 grams of α-(3,4-dichlorobenzyl)-β-(4-chlorophenyl)-propionitrile are dissolved in 800 cc. of dioxane saturated with ammonia and the solution is hydrated at a pressure of 100–110 atmospheres gauge and a temperature ranging between 40 and 50° C. in the presence of Raney nickel. After the absorption of hydrogen is complete, catalyst and solvent are separated by suction-filtration and distillation. The crude amine obtained is dissolved in 500 cc. of diisopropyl ether, mixed with 40 cc. of alcoholic hydrochloric acid of 31% strength and the precipitated salt is filtered off with suction. The 2-(3',4'-dichlorobenzyl)-3-(4'-chlorophenyl) - propylamine-hydrochloride melts at 166–168° C. The yield amounts to 91 grams. By recrystallization from benzene/diisopropyl ether, the product can be further purified and melts then at 168–169° C.

By treating the salt with sodium hydroxide solution and ether, the free 2-(3',4'-dichlorobenzyl)3-(4'-chlorophenyl)-propylamine can be obtained in usual manner as a light yellow viscous oil.

The α-(3,4-dichlorobenzyl)-β(4-chlorophenyl)-propionitrile used as starting material can be prepared as follows: to a solution of 16 grams of sodium in 200 cc. of methanol there are added dropwise 155 grams of 4-chlorobenzyl-cyanoacetic acid-methyl ester. The mixture is stirred for about 15 minutes and 136 grams of 3,4-dichlorobenzylchloride are then added dropwise. After mechanically stirring for one hour and heating under reflux, the mixture is cooled whereby crystallization sets in. The product is filtered off with suction, washed with methanol, the residue is stirred with water, thoroughly washed with water on the suction-filter and dried in the air. There are obtained 190 grams of 3,4-dichlorobenzyl-4'-chlorobenzyl-cyanoacetic acid-methyl ester melting at 80–82° C. The product can be purified by recrystallization from methanol and melts then at 81–82° C.

185 grams of 3,4-dichlorobenzyl-4'-chlorobenzyl-cyanoacetic acid methyl ester are introduced into a solution of 27 grams of potassium hydroxide in 500 cc. of methanol and the solution is heated at the boil for several minutes. The solvent is then distilled off to a large extent, the residue is poured into water and filtered off after addition of animal charcoal. The filtrate is acidified with dilute hydrochloric acid whereby a smeary precipitate is formed which soon solidifies when allowed to stand. After comminution, the liquid part is filtered off with suction and the residue is washed well with water. There are obtained 156 grams of 3,4-dichlorobenzyl-4'-chlorobenzyl-cyanoacetic acid melting at 127–130° C.

145 grams of 3,4-dichlorobenzyl-4'-chlorobenzyl-cyanoacetic acid are decarboxylated by heating to 200–220° C. in an open flask. After termination of the gas evolution, the substance is cooled whereby simultaneously 100 cc. of alcohol are added thereto. The crystallized product is filtered off with suction. There are obtained 102 grams of α - (3,4 - dichlorobenzyl)-β-(4-chlorophenyl)-propionitrile melting at 71–73° C. After recrystallization from isopropanol, the product melts at 73–74° C.

*Example 8*

2,2-BIS-(3',4'-DICHLOROBENZYL)-PENTYLAMINE 125 grams of α,α-bis-(3,4-dichlorobenzyl)-valeronitrile are hydrated in the presence of Raney nickel in 800 cc. of dioxane saturated with ammonia at a pressure ranging between 100 and 110 atmospheres gauge and a temperature of 50° C. After completion of the hydrogen absorption, the liquid part is removed from the catalyst by suction-filtration and the solvent is distilled off. The remaining oil is dissolved in 500 cc. of ethyl acetate. After the addition of 40 cc. of alcoholic hydrochloric acid of 31% strength, the 2,2-bis-(3',4'-dichlorobenzyl)-pentylamine-hydrochloride separates. It is filtered off with suction. There are obtained 78 grams of a colorless product which can be further purified by recrystallization from isoamyl alcohol. The pure salt melts at 243–245° C.

The free 2,2-bis-(3',4'-dichlorobenzyl)-pentylamine can be obtained in usual manner from this salt by treating it with ether and sodium hydroxide solution. It is a yellowish viscous oil.

The α,α-bis-(3,4-dichlorobenzyl)-valeronitrile serving as starting material can be obtained as follows: 500 grams of 3,4-dichlorobenzylchloride and 106 grams of butylcyanide are dissolved in 1000 cc. of benzene and the solution is heated to a temperature ranging between 50° C. and 60° C. To this solution there is then added in portions a suspension of 125 grams of sodium amide in 500 cc. of benzene. After stirring for one hour at the same temperature, the reaction mixture is mixed with about the same quantity of water, the organic layer is washed with water until neutral, dried over calcium chloride and the residue remaining after distillation of the solvent is treated with 250 cc. of petroleum ether. The nitrile crystallizes and can be filtered with suction. There are obtained 147 grams of α,α-bis-(3,4-dichlorobenzyl)-valeronitrile which may be further purified by recrystallization from isopropanol. It melts then at 160–161° C.

*Example 9*

β-AMINO-α,α-BIS-(4-CHLOROBENZYL)-PROPIONIC ACID-METHYL ESTER 200 grams of bis-(4-chlorobenzyl)-cyanoacetic acid-methyl ester, prepared as described in Example 3, are dissolved in 2000 cc. of dioxane saturated with ammonia, and hydrated in the presence of Raney nickel at a pressure ranging between 100 and 120 atmospheres gauge and a temperature ranging between 40° C. and 50° C. The hydrogen absorption being complete, the liquid part is removed from the catalyst by suction-filtration and the solvent is removed by distillation. The remaining base is dissolved in 1000 cc. of diisopropyl ether and 80 cc. of alcoholic hydrochloric acid of 28% strength are added thereto. The precipitated salt is filtered with suction and washed with diisopropyl ether. There are obtained 192 grams of β-amino - α,α-bis - (4-chlorobenzyl) - propionic acid-methyl ester hydrochloride which melts at 194° C. and 195° C. with decomposition. It can be purified by recrystallization from isopropanol and melts then with decomposition at a temperature ranging between 197° C. and 198° C. The free β-amino-α,α-bis-(4-chlorobenzyl)-propionic acid-methyl ester can be obtained from the salt in the usual manner in the form of a yellowish thick oil.

*Example 10*

β-AMINO-α,α-BIS-(3,4-DICHLOROBENZYL)-PROPIONIC ACID-METHYL ESTER 100 grams of bis-(3,4-dichlorobenzyl)-cyanoacetic acid methyl ester, prepared as described in Example 4, are hydrated in 800 cc. of dioxane saturated with ammonia at a pressure of 100 atmospheres gauge and 50° C. in the presence of Raney nickel. Catalyst and solvent are removed by suction-filtration and distillation, respectively. The crude amine is dissolved in 1000 cc. of ethyl acetate and mixed with 32 cc. of alcoholic hydrochloric acid of 28% strength. After standing for several hours in the cold, the liquid part is removed by suction-filtration. There are obtained 90 grams of β-amino-α,α,-bis-(3,4-dichlorobenzyl)-propionic acid-methyl ester hydrochloride melting at 190–192° C. with decomposition. The product can be recrystallized from 350 cc. of isopropanol and melts then at 191–192° C. with decomposition.

The free base can be obtained in usual manner by treating the salt with dilute sodium hydroxide solution and ether. It is a yellowish viscous oil which solidifies to a crystalline mass when standing for a prolonged period and melts at 82–84° C. after recrystallization from diisopropyl ether/petroleum ether.

*Example 11*

3-HYDROXY-2,2-BIS-(3',4'-DICHLOROBENZYL)-PROPYLAMINE

To a suspension of 20 grams of lithium-aluminium-hydride in 500 cc. of dry ether there is added dropwise within one hour a solution of 64.5 grams of bis-(3,4-dichlorobenzyl)-cyanoacetic acid-methyl ester, prepared as described in Example 4, in 1000 cc. of dry ether and the reaction mixture is then heated under reflux for another hour. There are then carefully and successively added 8 cc. of water, 6 cc. of a sodium hydroxide solution of 20% strength and 39 cc. of water, and the whole is stirred until the initially grey precipitate has become colorless. The precipitate is filtered off with suction and washed well with ether. The filtrate is mixed with 20 cc. of alcoholic hydrochloric acid of 30% strength and the precipitate formed is filtered with suction. There are obtained 65 grams of 3-hydroxy-2,2-bis-(3',4'-dichlorobenzyl)-propylamine-hydrochloride which can be purified by recrystallization from methanol/ether and melts at 265–266° C. with decomposition.

*Example 12*

β-AMINO-α,α-BIS-(3,4-DICHLOROBENZYL)-PROPIONIC ACID ETHYL ESTER 325 grams of bis-(3,4-dichlorobenzyl)-cyanoacetic acid-ethyl ester are dissolved in 2000 cc. of dioxane saturated with ammonia, and hydrated with Raney nickel as catalyst at a pressure of 100 atmospheres gauge and 50° C. until the hydrogen absorption is complete. After separation from the catalyst and distillation of the solvent, the residual crude aminocarboxylic acid ester is dissolved in 500 cc. of ethyl acetate. After addition of 90 cc. of an alcoholic hydrochloric acid solution of 31% strength, the β-amino-α,α-bis-(3,4-dichlorobenzyl)-propionic acid-ethyl ester hydrochloride crystallizes out. It is colorless, melts at 207–209° C. and is obtained in a yield of 250 grams. After recrystallization from ethanol, there are obtained colorless crystals melting at 209–210° C.

The free β-amino-α,α-bis-(3,4-dichlorobenzyl)-propionic acid-ethyl ester can be obtained in usual manner from the hydrochloride. The free compound is a colorless viscous oil.

The bis-(3,4-dichlorobenzyl)-cyanoacetic acid-ethyl ester serving as starting material can be prepared as follows: to a solution of 46 grams of sodium in 750 cc. of absolute ethanol there are added dropwise first 124 grams of cyanoacetic acid-ethyl ester and then 430 grams of 3,4-dichlorobenzyl chloride and the reaction mixture is then heated for one hour under reflux. On cooling, the reaction product crystallizes out. It is filtered off with suction, washed with alcohol, stirred with water, filtered with suction and washed well with water. There are obtained 325 grams of bis-(3,4-dichlorobenzyl)-cyanoacetic acid ethyl ester melting at 99–100° C. The melting point remains constant even after recrystallization from alcohol.

*Example 13*

β-AMINO-α,α-BIS-(2,4-DICHLOROBENZYL)-PROPIONIC ACID-n-BUTYL ESTER 187 grams of bis-(2,4-dichlorobenzyl)-cyanoacetic acid-n-butyl ester are hydrated at 50° C. and a pressure of 100 atmospheres gauge, in the presence of Raney nickel, in 1800 cc. of dioxane saturated with ammonia until the hydrogen absorption is complete. After separation from the catalyst and evaporation of the solvent, the crude amine is dissolved in 1500 cc. of diisopropyl ether, the solution is clarified with animal charcoal and 50 cc. of alcoholic hydrochloric acid of 31% strength are added thereto. The β-amino-α,α-bis-(2,4-dichlorobenzyl)-propionic acid-n-butyl ester hydrochloride slowly crystallizes out. After suction-filtration there are obtained 125 grams of the salt melting at 127–131° C. When being recrystallized from acetone/diisopropyl ether, the compound forms small felted needles melting at 131–132° C.

The free β-amino-α,α-bis-(2,4-dichlorobenzyl)-propionic acid-n-butyl ester can be obtained from the salt in usual manner and represents a yellowish very viscous oil.

The bis-(2,4-dichlorobenzyl)-cyanoacetic acid-n-butyl ester serving as starting material can, for instance, be prepared as follows: 155 grams of cyanoacetic acid-n-butyl ester are added dropwise to a solution of 46 grams of sodium in 1000 cc. of n-butanol and after stirring for 15 minutes, while slightly cooling, there are slowly added thereto 430 grams of 2,4-dichlorobenzyl chloride. The reaction mixture is heated for one hour under reflux and then highly concentrated by distilling off the solvent. On cooling, the reaction product crystallizes out. After suction-filtration, the solid residue is treated with water in order to remove the sodium chloride. The bis-(2,4-dichlorobenzyl)-cyanoacetic acid-n-butyl ester melts at 60–62° C.; the yield amounts to 187 grams. Even after recrystallization from alcohol, the melting point remains practically unchanged.

We claim:

1. A compound of the group consisting of (1) substituted amines of the formula

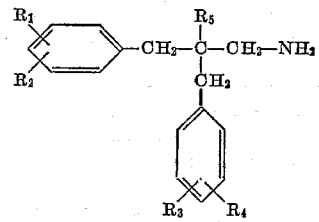

in which $R_1$ and $R_3$ are halogen, $R_2$ and $R_4$ are members of the group consisting of hydrogen and halogen and $R_5$ is a member of the group consisting of hydrogen, alkyl of 1–5 carbon atoms, hydroxymethyl, and carbalkoxy, the alkyl groups of which are of 1 to 4 carbon atoms, and (2) physiologically compatible acid addition salts thereof.

2. The 2,2-bis-(4'-chlorobenzyl)-propylamine.

3. The 2-(3',4'-dichlorobenzyl)-3-(3',4'-dichlorophenyl)-propylamine.

4. The β-amino-α,α-bis-(4-chlorobenzyl)-propionic acid-methylester.

5. The 2-(2',4'-dichlorobenzyl)-3-(2',4'-dichlorophenyl)-propylamine.

6. The β-amino-α,α-bis-(2,4-dichlorobenzyl)-propionic acid-n-butylester.

(References on following page)

References Cited in the file of this patent

UNITED STATES PATENTS

| | | |
|---|---|---|
| 2,797,242 | Egerton et al. | June 25, 1957 |
| 2,982,781 | Montgomery et al. | May 2, 1961 |

OTHER REFERENCES

Dulique: Compt. rend., 190, 878–81 (1930).

Hickinbottom: Reactions of Organic Compounds (London 1948), pages 283–284.

Gaylord: Reduction With Complex Metal Hydrides (New York 1956), pages 731–750.